(12) United States Patent
Lee et al.

(10) Patent No.: US 7,566,408 B2
(45) Date of Patent: *Jul. 28, 2009

(54) YAG LASING SYSTEMS AND METHODS

(75) Inventors: Hee Dong Lee, Centerville, OH (US); Tai-Il Mah, Centerville, OH (US); Triplicane A. Parthasarathy, Beavercreek, OH (US); Kristin A. Keller, Springboro, OH (US)

(73) Assignee: UES, Inc., Dayton, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 11/173,444

(22) Filed: Jul. 1, 2005

(65) Prior Publication Data

US 2005/0281302 A1 Dec. 22, 2005

(51) Int. Cl.
*C04B 35/44* (2006.01)
*C09K 11/80* (2006.01)

(52) U.S. Cl. .............. 252/301.4 R; 501/152; 501/153; 264/662; 264/663; 264/664; 264/665; 264/666; 264/667

(58) Field of Classification Search .......... 252/301.4 R; 501/152, 153; 423/600; 372/39, 41, 42; 264/662–667

See application file for complete search history.

(56) References Cited

U.S. PATENT DOCUMENTS

| 5,114,702 | A | | 5/1992 | Pederson et al. |
| 5,484,750 | A | * | 1/1996 | Greskovich et al. .......... 501/86 |
| 6,200,918 | B1 | | 3/2001 | Yanagitani et al. |
| 6,409,938 | B1 | | 6/2002 | Comanzo |
| 6,447,937 | B1 | | 9/2002 | Murakawa et al. |
| 6,496,250 | B1 | | 12/2002 | Duclos et al. |
| 6,844,285 | B1 | | 1/2005 | Wei |
| 7,022,262 | B2 | * | 4/2006 | Lee et al. .............. 252/301.4 R |
| 2002/0012791 | A1 | | 1/2002 | Morita et al. |
| 2003/0175004 | A1 | | 9/2003 | Garito et al. |

FOREIGN PATENT DOCUMENTS

| JP | 10101334 | 4/1998 |
| JP | 10101411 | 4/1998 |
| JP | 10114519 | 5/1998 |

OTHER PUBLICATIONS

Chem abstract citation 123:264101:Synthesis ofNd3+,Cr3+-codoped YAG ceramics for high-efficiency solid-state lasers, Ikesue et al, Jour. Amer, Ceramic Soc, 78(9), 1995, pp. 2545-2547.*
Chem Abstract citation 137:282859: A review of ceramic materials for optical applications, Ikesue, Reza Kenkyu, 30(6), 2002, pp. 290-296.*

* cited by examiner

*Primary Examiner*—C. Melissa Koslow
(74) *Attorney, Agent, or Firm*—Dinsmore & Shohl LLP

(57) ABSTRACT

Lasing systems utilizing YAG and methods for producing a YAG suitable for lasing are provided. The lasing system comprises a laser activator and a laser host material is provided. The laser host material comprises a transparent polycrystalline yttrium aluminum garnet material defined by a low porosity of less than about 3 ppm.

9 Claims, No Drawings

YAG LASING SYSTEMS AND METHODS

BACKGROUND OF THE INVENTION

YAG is a very attractive compound for high temperature structural applications. Additionally, YAG exhibits high efficiency of energy transfer and radiation damage resistance, and YAG is an attractive laser host material. High optical transparency is important for laser applications, and polycrystalline YAG may be suitable for such applications. Polycrystalline YAG is often fabricated under vacuum at high temperatures for prolonged annealing periods. Additionally, the processes used to fabricate the precursor powders for polycrystalline YAG can be laborious and costly.

Thus, there remains a need in the art for methods of fabricating YAG and YAP containing powders and polycrystalline YAG that allow for reduced processing times and reduced cost. Additionally, there remains a need in the art for YAG having improved properties.

SUMMARY OF THE INVENTION

In accordance with one embodiment of the present invention, a lasing system comprising a laser activator, and a laser host material is provided. The laser host material comprises a transparent polycrystalline yttrium aluminum garnet material defined by a low porosity of less than about 3 ppm.

In accordance with another embodiment of the present invention, a method of producing polycrystalline yttrium aluminum garnet is provided. The method comprises the steps of: providing a compact comprising at least one powder selected from undoped yttrium aluminum garnet, doped yttrium aluminum garnet, a powder mixture having undoped yttrium aluminum perovskite, and a powder mixture having doped yttrium aluminum perovskite; sintering the compact in air at temperatures of between about 1500° C. to about 1700° C. such that sintered yttrium aluminum garnet is formed; and hot isostatically pressing the sintered yttrium aluminum garnet at temperatures of between about 1400° C. to about 1600° C. and at pressures sufficient to form a transparent polycrystalline yttrium aluminum garnet is formed having a porosity between less than about 3 ppm.

The systems and methods of the present invention are advantageous, especially the lasing system using YAG. These and additional objects and advantages provided by the systems and methods of the present invention will be more fully understood in view of the following detailed description.

DETAILED DESCRIPTION

In accordance with one embodiment of the present invention, a lasing system comprising a laser activator and a laser host material is provided. The laser host material comprises a transparent polycrystalline yttrium aluminum garnet material defined by a low porosity of less than about 3 ppm. The low porosity of the yttrium aluminum garnet material is operable to improve the optical quality of the lasing system by substantially eliminating optical scattering. The transparent may lase with at least half of the optical efficiency of a single crystal of the same composition. In another embodiment, the yttrium aluminum garnet material comprises a pore size of about 500 nm or less. In further embodiments, the transparent polycrystalline aluminum garnet material may comprise a porosity of less than 1 ppm and may also comprise a mean grain size of about 1 to about 2 µm.

In another embodiment, the laser activator comprises a plurality of trivalent laser activator ions. Optionally, the trivalent laser activator ions may comprise transition metals or rare earth elements. In a specific embodiment, the laser host material is operable to receive the plurality of trivalent laser activator ions. The transparent polycrystalline aluminum garnet material may comprise dopant material, such as Nd.

In accordance with another embodiment of the present invention, a method of producing a powder is provided. The method comprises combining at least one salt of aluminum (Al) with at least one salt of yttrium (Y) to form an aqueous mixture. The Al and Y are present at a mole ratio of 3:5 Y to Al in the mixture. The method further comprises adding at least one reducing agent and at least one auxiliary oxidizing agent to the mixture and heating the mixture to a first temperature such that the mixture undergoes combustion and a powder is formed. The method further comprises calcining the powder at temperatures between about 700° C. to about 1300° C. until the powder comprises single phase cubic yttrium aluminum garnet (YAG). For the purposes of defining and describing the present invention, undoped YAG shall be understood as referring to $Y_3Al_5O_{12}$.

Any suitable salt of Al may be used. For example, an aluminum nitrate salt such as $Al(NO_3)_3.9H_2O$, an aluminum perchlorate, and an aluminum sulfate salt may be used. Any suitable salt of Y may be used. For example, an yttrium nitrate salt such as $Y(NO_3).6H_2O$, an yttrium perchlorate, and an yttrium sulfate salt may be used. The Al salt and Y salt may be dissolved in de-ionized water to form the aqueous mixture.

Any suitable salt of Al may be used, singularly or in combination with other Al salts. For example, the Al salt may comprise an aluminum nitrate salt such as $Al(NO_3)_3.9H_2O$, an aluminum perchlorate, an aluminum sulfate salt, and combinations thereof. Any suitable salt of Y may be used, singularly or in combination with other Y salts. For example, a Y salt may comprise an yttrium nitrate salt such as $Y(NO_3).6H_2O$, an yttrium perchlorate, and an yttrium sulfate salt, and combinations thereof. The Al salt and Y salt may be dissolved in de-ionized water to form the aqueous mixture.

Any suitable reducing and oxidizing agents may be used and added to the aqueous mixture in any suitable manner. For example, the aqueous mixture comprises at least one reducing agent such as alanine, and at least one auxiliary oxidizing agent such as ammonium nitrate. The alanine may comprise β-alanine, DL-alanine, or combinations thereof. The total moles of the reducing agent and the auxiliary oxidizing agent may be between about 1.4 to about 1.5 times the total moles of the Al salt plus the Y salt. For example, the total moles of the reducing and auxiliary oxidizing agent may be about 1.48 times the total moles of the Al salt plus the Y salt. When the reducing and auxiliary oxidizing agents comprise alanine and ammonium nitrate, the mole ratio of ammonium nitrate to alanine may be between about 1.4 to about 1.5. For example, the mole ratio may be about 1.49. The reducing and auxiliary oxidizing agents may be added to the aqueous mixture and completely dissolved by vigorous stirring. The mixture may then be heated to remove the water from the mixture. For example the mixture may be heated to about 110° C. for about 2 hours to about 3 days.

The mixture is heated to a first temperature such that the mixture undergoes combustion and a powder is formed. The first temperature may be between about 220° C. to about 250° C. The combustion generally results in a large volume expansion and the production of a powder. The powder may comprise an amorphous phase YAG, and the phase may be determined by utilizing X-ray powder diffraction. The primary particle size may be between about 30 to about 50 nm. The primary particle size may be measured using scanning electron microscopy.

After the powder is formed, it may be de-agglomerated prior to the calcination step. For example, the powder may be de-agglomerated by milling in a polyethylene bottle with ethyl alcohol using alumina balls having a purity of greater then 99.9% at about to about 20 r.p.m. for about 24 hours. The powder may then be subsequently dried.

The powder is calcined in air at temperatures between about 700° C. to about 1300° C. The powder may be calcined in an alumina crucible. The powder may be calcined for any suitable period. For example, the powder may be calcined for about two hours with a 10° C./minute rate of heating and cooling. The powder is generally calcined until the powder comprises single phase cubic YAG. For example, the powder may comprise cubic YAG as the major phase after being calcined to 700° C., and the powder may be completely transformed to single phase cubic YAG after being calcined to 1000° C. The single phase cubic YAG generally has a primary particle size of between about 30 to about 60 nm. The particle size may be measured by transmission electron microscopy (TEM) or by a high resolution scanning electron microscopy (HRSEM). For example, the single phase cubic YAG may have a primary particle size of about 50 nm.

An alternative method of producing a powder according to the present invention is provided. The method comprises combining at least one oxide of aluminum with at least one salt of yttrium to form an aqueous mixture. The Al and Y are present at a mole ratio of 3:5 Y to Al in the mixture. The method further comprises adding at least one reducing agent to the mixture and heating the mixture to a first temperature such that the mixture undergoes partial combustion and a powder is formed. The method further comprises calcining the powder at a first temperature range and subsequently calcining the powder at a second temperature range until at least some of the powder comprises an yttrium aluminum perovskite (YAP) phase. The first temperature range is lower than the second temperature range. The second temperature range comprises between about 700° C. to about 1300° C. For purposes of defining and describing the present invention, YAP shall be understood as referring to YAlO$_3$.

Any suitable oxide of Al may be used. For example, $\alpha$-Al$_2$O$_3$, $\gamma$-Al$_2$O$_3$, or mixtures thereof may be used. Any suitable salt of Y may be used. For example, an yttrium nitrate salt such as Y(NO$_3$)$_3$.6H$_2$O, an yttrium perchlorate, and an yttrium sulfate salt may be used. The oxide of Al and the Y salt may be dissolved in de-ionized water to form the aqueous mixture.

Any suitable reducing agent may be used and added to the aqueous mixture in any suitable manner. For example, alanine, such as $\beta$-alanine and DL-alanine, may be used as a reducing agent. The reducing agent may be added such that the reducing agent is added in about a 0.9 to about 1:1 mole ratio with the Y salt. The reducing agent may be added to the aqueous mixture and completely dissolved by vigorous stirring. The mixture may then be heated to remove the water from the mixture. For example the mixture may be gradually heated to about 110° C. for between about 2 to about 3 hours, and the mixture may be further dried in an oven at about 100° C. for about 3 days.

The mixture is heated to a first temperature such that the mixture undergoes partial combustion and a powder is formed. The first temperature may be about 200° C. to about 220° C. The partial combustion generally results in a large volume expansion and the production of a powder. The powder may be dispersed in ethyl alcohol with an ultrasonic bath, and the powder may be subsequently dried.

The powder is calcined at a first temperature range. The first temperature range may be 600° C. with a about a 5° C. to about a 10° C./minute rate of heating and cooling. The powder may be de-agglomerated after the calcining at the first temperature range. For example, the powder may be de-agglomerated by milling in a polyethylene bottle with ethyl alcohol using alumina balls having a purity of greater than 99.9% at about 5 to about 20 r.p.m. for about 24 hours. The powder may then be subsequently dried.

The powder is calcined at a second temperature range in air, and the second temperature range is higher than the first temperature range. The second temperature range is generally between about 700° C. to about 1300° C. At least some of the powder comprises a YAP phase. The primary particle size is between about 30 nm to about 60 nm. The powder may comprise YAP, $\alpha$-Al$_2$O$_3$ or $\gamma$-Al$_2$O$_3$, and Y$_2$O$_3$ phases.

A doped powder may be formed in accordance with either of the preceding methods. In order to form a doped powder, a rare earth salt may be substituted for a portion of the yttrium salt such that the ratio of rare earth plus yttrium to aluminum is 3:5. Any suitable rare earth element may be used. For example, Nd, Yb, Sc, Pr, Eu, and Er may be used. Any suitable rare earth salt may be used. For example, the rare earth salt may comprise neodymium nitrate, Nd(NO$_3$)$_3$.6H$_2$O, and the neodymium nitrate may be added such that neodymium substitutes for 2 atomic percent of the yttrium. Thus, the resulting doped YAG will have a stoichiometry of (Nd$_{0.02}$Y$_{0.98}$)$_3$Al$_5$O$_{12}$. It will be understood that the rare earth salt may be substituted in any desired proportion to the Y. The mixtures are further processed as discussed above.

The undoped and doped single phase cubic YAG and YAP containing powders may be further processed in any suitable manner. For example, the powders may be subject to further powder processing to aid in engineering the surface of the particles to achieve uniform particle packing and appropriate green strength. In one example, the powders may be dispersed in ethyl alcohol, and 0.5 weight percent tetraethyl orthosilicate (TEOS), or about 0.10 to about 0.15 weight percent colloidal silica (99.9% and higher purity) may be added as a sintering aid. The suspension may be dried under stirring and then placed in a crucible and calcined at 600° C. in air for about 1 hour with 10° C./minute heating and cooling rates. After calcining, 3 weight percent of polyethylene glycol (PEG) having a molecular weight distribution of between about 300 to about 600 may be added to the powder. The powder may then be ball milled in ethyl alcohol using a polyethylene bottle for 5 hours at less than 20 r.p.m. The powders may be dried, granulated using a 200 mesh nylon sieve, and stored.

In accordance with another embodiment of the present invention, a method of forming polycrystalline YAG is provided. The method comprises providing a compact comprising at least one powder selected from undoped YAG, doped YAG, a powder mixture having undoped YAP, and a powder mixture having doped YAP. The method further comprises sintering the compact in flowing oxygen at temperatures of between about 1500° C. to about 1700° C., or about 1550° to about 1650° C., such that sintered YAG is formed, and the method comprises hot isostatically pressing the sintered YAG at temperatures of between about 1400° C. to about 1600, or about 1450° to about 1550° C., at a pressure between about 25 kpsi to about 30 kpsi such that a transparent polycrystalline YAG having an average grain size between about 1 µm to about 3 µm is formed. For purposes of defining and describing the present invention, "transparent" shall be understood as referring to a YAG capable of transmitting light in the visible range of the spectrum. Additionally, the transparent YAG may be capable of transmitting light from the visible range to the mid-IR (about 5.5 µm) range of the spectrum. Moreover, the transparent YAG may comprise an in-line transmittance of about 80% and above from the visible range to the near IR (about 2.5 μm), wherein the transmittance is typically about 82 to about 84% at the wavelength of the laser. The wavelength of a laser may vary depending on the dopant used. In one embodiment, the laser host material comprising transparent YAG with a Nd dopant has a wavelength of 1064 nm.

Generally, the powder in the compact is a powder prepared in accordance with the methods as discussed above. The compact may be prepared in accordance with any suitable method. The compact may be formed by unidirectionally cold pressing the granulated powder using a metal die under 2 kg/cm$^2$ pressure. Additional methods. such as slip casting, may also be used. The green compact may then be vacuum bagged and cold isostatically pressed at 200 MPa pressure. In another example, the compact may be formed by using suitable slip casting methods. For example, a slurry may be prepared by ball milling the calcined powder in de-ionized water after adding about 0.5% to about 1.0% of ammonium polyacrylate. The slurry may be slip cast using a gypsum mold or a porous membrane. After slip casting, the green compacts may be dried in the ambient atmosphere for about 24 hours and then further dried in an oven at about 100° C.

The compacts may be further processed to burn out the binder in any suitable manner. For example, the compacts may be placed on alumina substrates and heated in a box furnace to 700° C. in air with a slow heating rate of between about 0.5 to about 1.0° C./minute and a 10 minute hold at the peak temperature. The compacts may then be cooled to room temperature at 10° C./minute. It will be understood that the compacts may be prepared in accordance with any suitable process prior to sintering and hot isostatic pressing.

The compacts may be sintered any suitable manner. For example, the compacts may be sintered in an alumina container in an alumina tube muffle furnace. The compacts may be sintered for any suitable time. For example, the compacts may be sintered for a holding period of between about 5 hours to about 20 hours. The compacts may be sintered such that the heating and cooling rates are about 5° C. to about 15° C./minute. Generally, the sintered YAG has a density of between about 95.0% to about 99.5% of the theoretical density of the compact after sintering. The density may be estimated by the Archimedes method after boiling the compacts in de-ionized water. The density of undoped YAG is 4.55 g/cm$^3$. Additionally, the compacts may have an open porosity of between about 0.5 volume percent and about 5.0 volume percent.

The sintered YAG may be hot isostatically pressed in any suitable manner for any suitable length of time. For example, the sintered YAG may be hot isostatically pressed at a pressure of 30 kpsi for between about 5 hours to about 20 hours. High purity argon may be used as a pressure medium. The surface of the compact may be polished after the compact is hot isostatically pressed. For example, the surface of the compact may be polished using a 1 μm diamond slurry.

The resulting YAG generally comprises a transparent polycrystalline YAG having a porosity of less than 3 ppm, and a mean grain size between about 1 μm to about 3 μm. It will be understood that the transparent polycrystalline YAG may be doped or undoped. The transparent polycrystalline YAG generally has high mechanical strength due to the uniformity of the microstructure. Additionally, the transparent polycrystalline YAG exhibits high optical transmittance. Thus, the transparent polycrystalline YAG of the present invention may be used in a variety of applications including, but not limited to, laser windows, high power laser hosts, IR windows, and missile domes.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of producing polycrystalline yttrium aluminum garnet, comprising:
    providing a compact comprising at least one powder selected from undoped yttrium aluminum garnet, doped yttrium aluminum garnet, a powder mixture having undoped yttrium aluminum perovskite, and a powder mixture having doped yttrium aluminum perovskite;
    sintering the compact in flowing oxygen at temperatures of between about 1500° C. to about 1700° C. such that sintered yttrium aluminum garnet is formed; and
    hot isostatically pressing the sintered yttrium aluminum garnet at temperatures of between about 1400° C. to about 1600° C. for about 5 to about 20 hours and at pressures sufficient to form a transparent polycrystalline yttrium aluminum garnet is formed having a porosity between less than about 3 ppm, and a mean grain size of about 1 to about 2 μm.

2. A method of producing polycrystalline yttrium aluminum garnet, comprising:
    providing a compact comprising at least one powder selected from undoped yttrium aluminum garnet, doped yttrium aluminum garnet, a powder mixture having undoped yttrium aluminum perovskite, and a powder mixture having doped yttrium aluminum perovskite;
    sintering the compact in flowing oxygen at temperatures of between about 1500° C. to about 1700° C. for about 5 to about 20 hours such that sintered yttrium aluminum garnet is formed; and
    hot isostatically pressing the sintered yttrium aluminum garnet at temperatures of between about 1400° C. to about 1600° C. and at pressures sufficient to form a transparent polycrystalline yttrium aluminum garnet is formed having a porosity between less than about 3 ppm, and a mean grain size of about 1 to about 2 μm.

3. A method according to claim 2 wherein the compact is sintered in flowing oxygen at temperatures of between about 1550 to about 1650° C.

4. A method according to claim 2 wherein the transparent polycrystalline yttrium aluminum garnet comprises a porosity of about 1 ppm.

5. A method according to claim 2 wherein the sintered yttrium aluminum garnet is hot isostatically pressed at a pressure between about 25 to about 30 ksi.

6. A method according to claim 2 wherein the sintered yttrium aluminum garnet is hot isostatically pressed at temperatures of between about 1450 to about 1550 °C.

7. A method according to claim 2 wherein the at least one powder of the compact is cold isostatically pressed or is slip casted.

8. A method according to claim 2 further comprising adding about 0.10 to about 0.15 weight percent colloidal silica having a purity of about 99.9% or greater.

9. A method according to claim 2 wherein the sintering is defined by a heating rate of about 5 to about 15° C/minute.

* * * * *